United States Patent
Maeda et al.

(10) Patent No.: US 10,268,870 B2
(45) Date of Patent: Apr. 23, 2019

(54) BIOMETRIC CAPTURE DEVICE, BIOMETRIC CAPTURE METHOD, AND COMPUTER-READABLE NON-TRANSITORY MEDIUM

(71) Applicant: FUJITSU LIMITED, Kawasaki-shi, Kanagawa (JP)

(72) Inventors: Satoshi Maeda, Atsugi (JP); Yukihiro Abiko, Kawasaki (JP); Soichi Hama, Atsugi (JP); Satoshi Semba, Kawasaki (JP); Hajime Nada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 60 days.

(21) Appl. No.: 15/444,444

(22) Filed: Feb. 28, 2017

(65) Prior Publication Data
US 2017/0262687 A1 Sep. 14, 2017

(30) Foreign Application Priority Data
Mar. 11, 2016 (JP) .................. 2016-048724

(51) Int. Cl.
*G06K 9/00* (2006.01)
*G06K 9/20* (2006.01)
(Continued)

(52) U.S. Cl.
CPC ....... *G06K 9/0004* (2013.01); *G06K 9/00033* (2013.01); *G06K 9/00201* (2013.01);
(Continued)

(58) Field of Classification Search
CPC .......... G06K 9/00006; G06K 9/00013; G06K 2009/00932; G06K 9/00892
(Continued)

(56) References Cited

U.S. PATENT DOCUMENTS 7,995,808 B2 * 8/2011 Rowe .................. G06K 9/2018
382/124
8,150,108 B2 * 4/2012 Miller ................ G06K 9/00892
340/5.53
(Continued)

FOREIGN PATENT DOCUMENTS

EP 1830306 A2 9/2007
EP 2919151 A2 9/2015
(Continued)

OTHER PUBLICATIONS

Extended European Search Report dated Jul. 31, 2017 for corresponding European Patent Application No. 17157843.8, 7 pages.

*Primary Examiner* — Yosef Kassa
(74) *Attorney, Agent, or Firm* — Fujitsu Patent Center

(57) ABSTRACT

A biometric capture device includes: a first light source configured to emit a light of a first wavelength to a biometric body; a second light source configured to emit a light of a second wavelength different from the first wavelength to the biometric body; a camera configured to capture a reflected light from the biometric body; a memory; and a processor coupled to the memory and the processor configured to execute a process, the process including: acquiring a biometric image based on a component of the first wavelength from an image captured by the camera; acquiring distance information between the biometric body and the camera based on a component of the second wavelength from the image captured by the camera; and correcting the biometric image based on the distance information.

12 Claims, 10 Drawing Sheets

(51) Int. Cl.
*G06T 5/00* (2006.01)
*G06T 7/60* (2017.01)

(52) U.S. Cl.
CPC .............. *G06K 9/20* (2013.01); *G06K 9/2036* (2013.01); *G06T 5/006* (2013.01); *G06T 7/60* (2013.01); *G06T 2207/10048* (2013.01)

(58) Field of Classification Search
USPC ................ 382/115, 116, 124, 209, 278, 291; 340/5.81, 5.82, 5.83
See application file for complete search history.

(56) References Cited

U.S. PATENT DOCUMENTS

| | | | | | |
|---|---|---|---|---|---|
| 8,170,301 | B2* | 5/2012 | Higuchi | ............... | A61B 5/1172 382/115 |
| 8,189,881 | B1* | 5/2012 | Smits | ................ | G06K 9/00046 340/5.53 |
| 8,644,562 | B2* | 2/2014 | Tosa | ................... | G06K 9/00604 382/117 |
| 8,649,569 | B2* | 2/2014 | Shindo | ................... | A61B 5/117 382/115 |
| 8,787,622 | B2* | 7/2014 | Watanabe | ......... | G06K 9/00342 382/115 |
| 8,831,297 | B2* | 9/2014 | Rowe | ................... | G06K 9/2018 382/124 |
| 8,855,378 | B2* | 10/2014 | Fukuda | ............. | G06K 9/00885 382/115 |
| 9,122,900 | B2* | 9/2015 | Aoki | ................... | G06K 9/00013 |
| 2014/0376005 | A1 | 12/2014 | Aoki | | |

FOREIGN PATENT DOCUMENTS

| | | |
|---|---|---|
| JP | 2008-246011 A | 10/2008 |
| JP | 2010-240215 A | 10/2010 |
| JP | 2013-257609 A | 12/2013 |

* cited by examiner

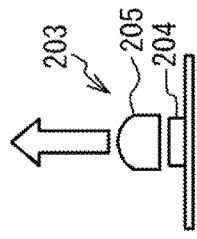
FIG. 1A
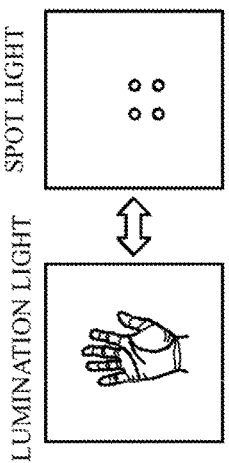
FIG. 1B
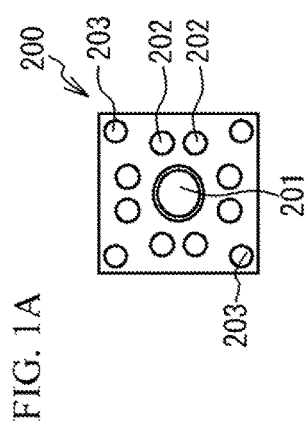
FIG. 1C
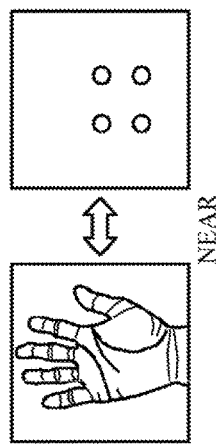
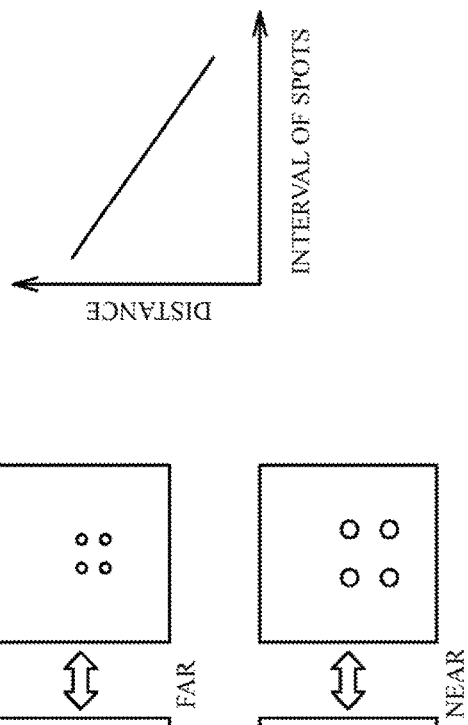
FIG. 1D ILLUMINATION LIGHT
FIG. 1E
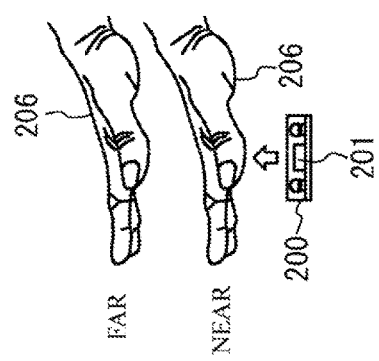
FIG. 1F

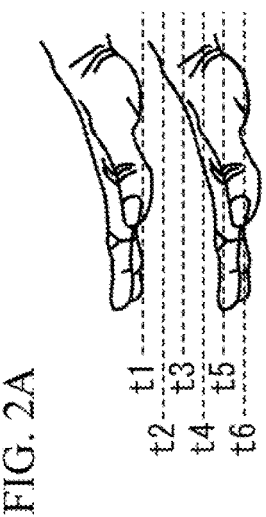
FIG. 2A
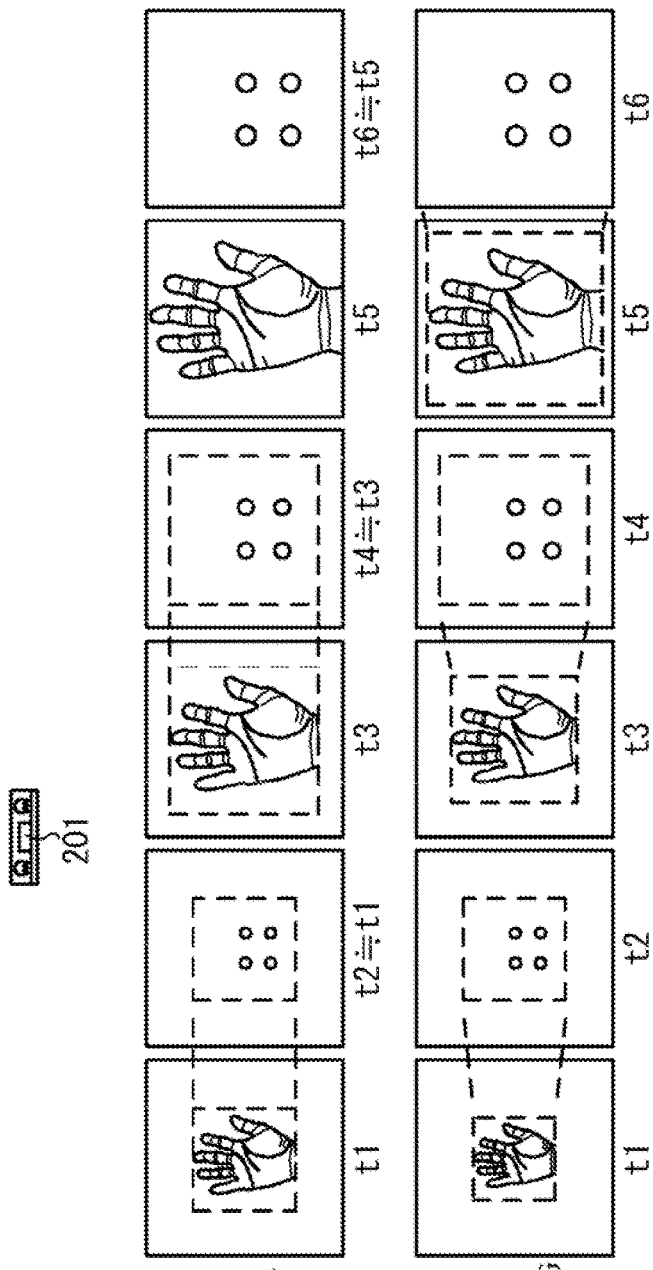
FIG. 2B
FIG. 2C

FIG. 3A
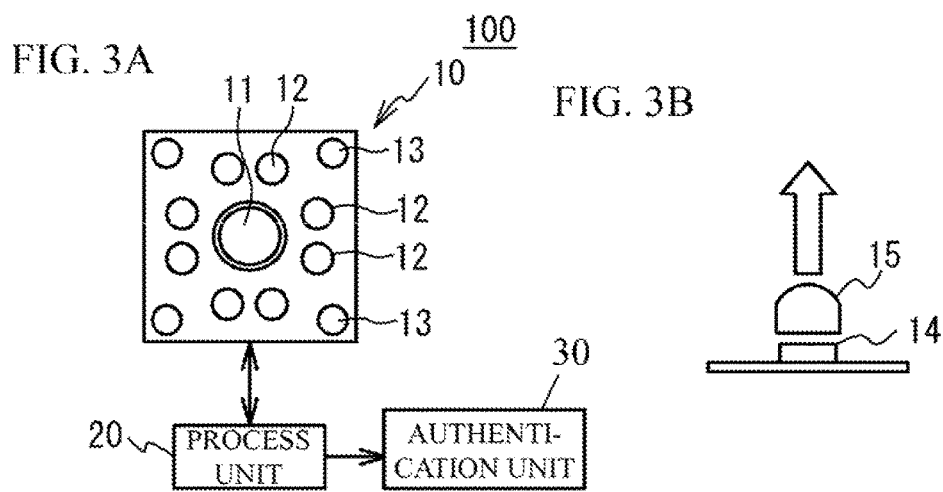
FIG. 3B
FIG. 3C
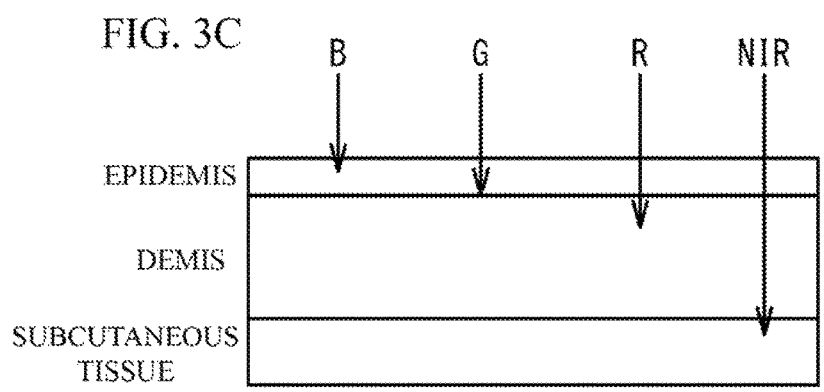
FIG. 3D
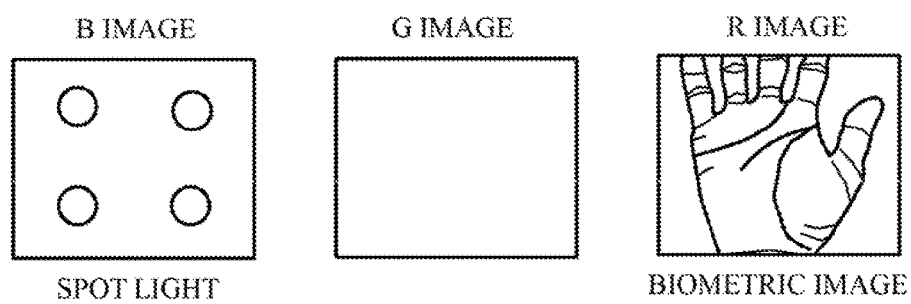
B IMAGE          G IMAGE          R IMAGE
SPOT LIGHT                        BIOMETRIC IMAGE

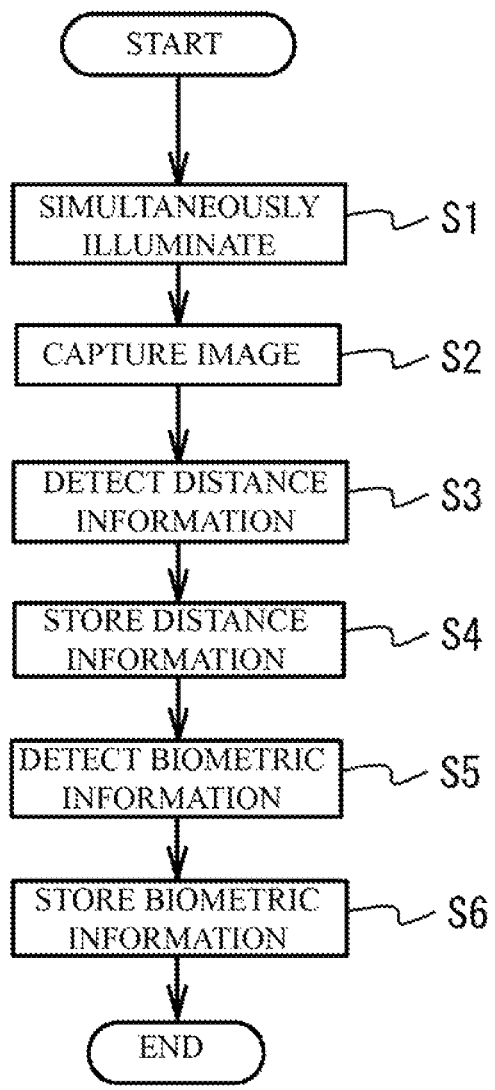

FIG. 9A
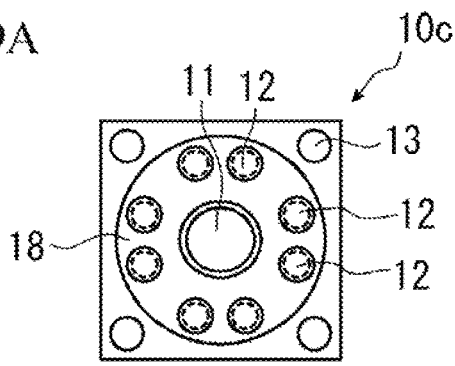
FIG. 9B
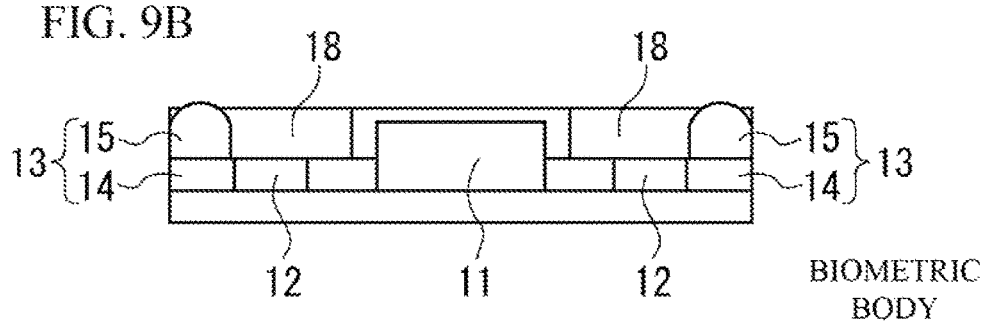
FIG. 9C
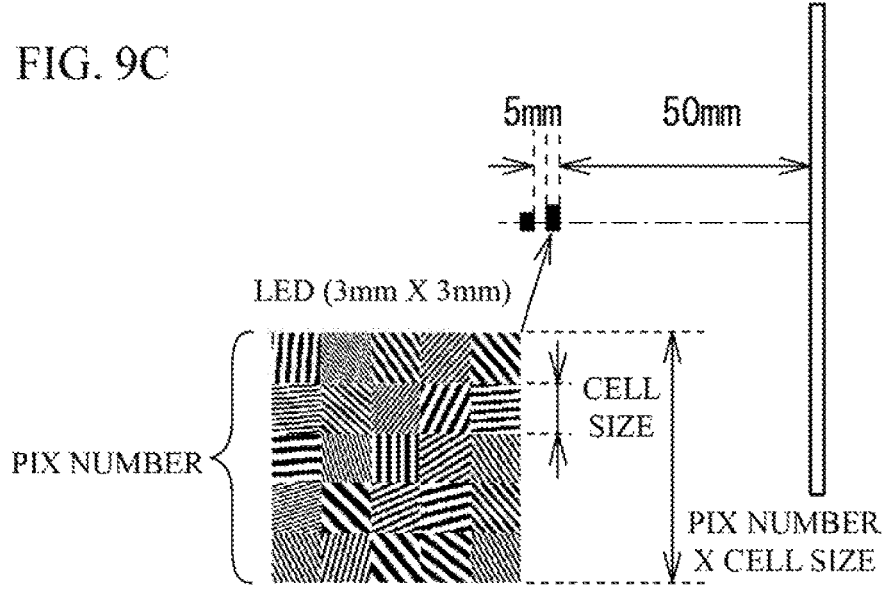
FIG. 9D
| PIX [N] | Cell Size [mm] | GCA Size [mm] |
|---|---|---|
| 250 | 0.02 | 5 |

FIG. 10A
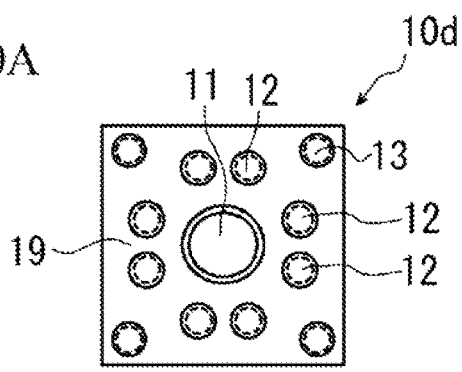
FIG. 10B
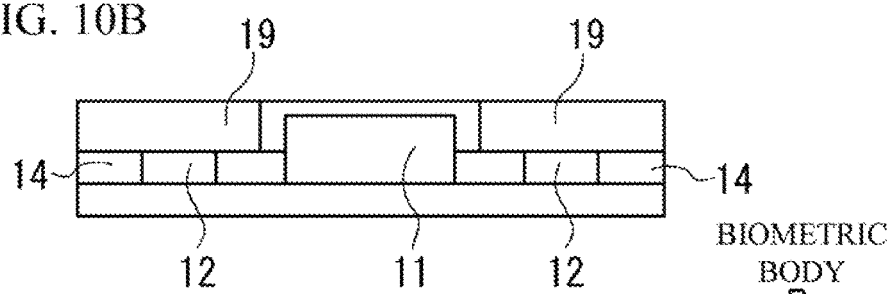
FIG. 10C
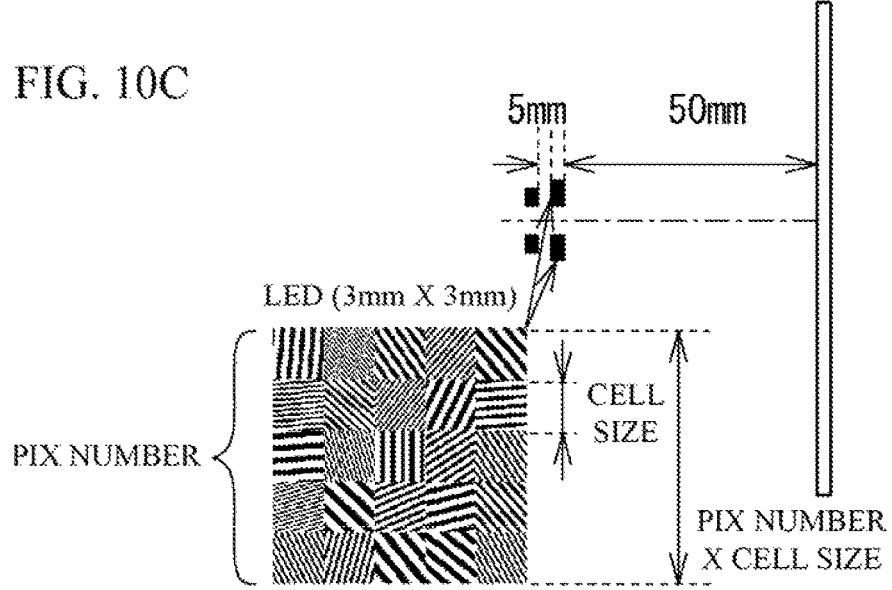
FIG. 10D
| PIX [N] | Cell Size [mm] | GCA Size [mm] |
|---|---|---|
| 120 | 0.025 | 3 |

BIOMETRIC CAPTURE DEVICE, BIOMETRIC CAPTURE METHOD, AND COMPUTER-READABLE NON-TRANSITORY MEDIUM

CROSS-REFERENCE TO RELATED APPLICATION

This application is based upon and claims the benefit of priority of the prior Japanese Patent Application No. 2016-048724, flied on Mar. 11, 2016, the entire contents of which are incorporated herein by reference.

FIELD

A certain aspect of embodiments described herein relates to a biometric capture device, a biometric capture method, and a computer-readable non-transitory medium.

BACKGROUND

In a biometric authentication, a light source emits a light to a biometric body, and biometric information is acquired with use a reflection light from the biometric body (for example, see Japanese Patent Application Publication No. 2013-257609, Japanese Patent Application Publication No. 2008-246011, and Japanese Patent Application Publication No. 2010-240215).

SUMMARY

In a biometric authentication, there may be a case where an illumination light source for emitting a light to a whole of a biometric body and a distance detection light source for acquiring a distance between the biometric body and an image capture device are provided. The illumination light source and the distance detection light source alternately emit a light. The image capture device captures an image of the biometric body at a light emission timing of the illumination light source and the distance detection light source. Thus, a biometric image is captured and a distance is acquired. A size of the biometric image is corrected according to the detected distance. However, when the biometric body moves, a gap occurs between a position of the biometric body at the light emission timing of the illumination light source and a position of the biometric body at the light emission timing of the distance detection light source. Therefore, it is difficult to calculate a concise correction amount.

According to an aspect of the present invention, there is provided a biometric capture device including: a first light source configured to emit a light of a first wavelength to a biometric body; a second light source configured to emit a light of a second wavelength different from the first wavelength to the biometric body; a camera configured to capture a reflected light from the biometric body; a memory; and a processor coupled to the memory and the processor configured to execute a process, the process including: acquiring a biometric image based on a component of the first wavelength from an image captured by the camera; acquiring distance information between the biometric body and the camera based on a component of the second wavelength from the image captured by the camera; and correcting the biometric image based on the distance information.

The object and advantages of the invention will be realized and attained by means of the elements and combinations particularly pointed out in the claims, it is to be understood that both the foregoing general description and the following detailed description are exemplary and explanatory and are not restrictive of the invention, as claimed.

BRIEF DESCRIPTION OF DRAWINGS

FIG. 1A to FIG. 1F illustrate a comparative example;
FIG. 2A to FIG. 2C illustrate a comparative example;
FIG. 3A illustrates a biometric authentication device in accordance with a first embodiment;
FIG. 3B illustrates a side view of a distance detection light source;
FIG. 3C illustrates a relationship between a wavelength of a radiated light to a biometric body and a reflection position of the biometric body;
FIG. 3D illustrates an image captured by a camera;
FIG. 5 illustrates a flowchart of an enrollment process;
FIG. 9 to FIG. 9D illustrate an image capture device in accordance with a fourth embodiment;
and
FIG. 10A to FIG. 10D illustrate an image capture device in accordance with a fifth embodiment.

DESCRIPTION OF EMBODIMENTS

Figure 4A:
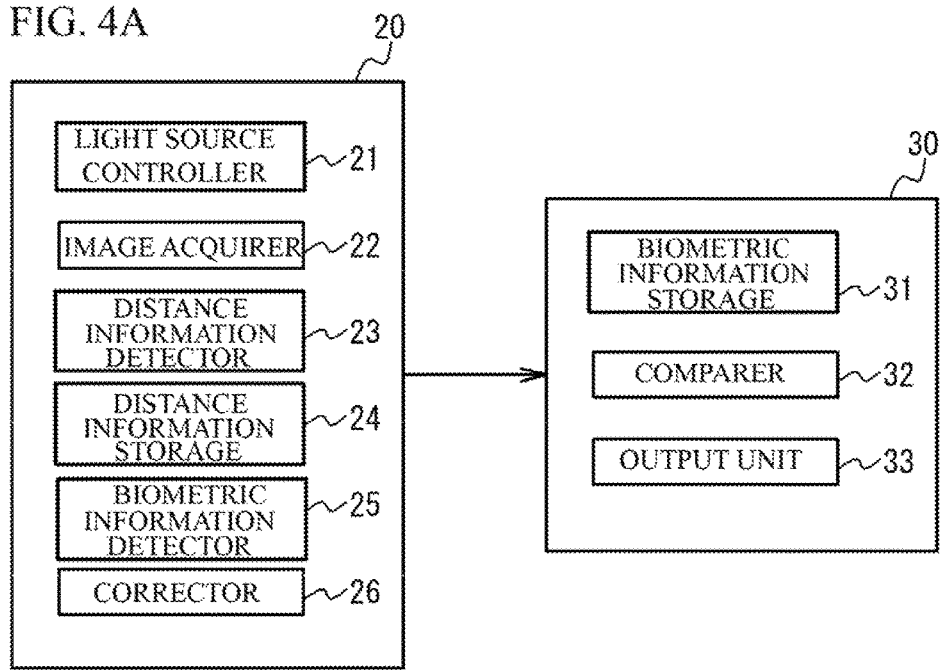
FIG. 4A illustrates a block diagram of a process unit and a comparer.

A description will be given of a comparative example before describing embodiments. FIG. 1A illustrates a plan view of a biometric capture device 200 in accordance with the comparative example. As illustrated in FIG. 1A, the biometric capture device 200 has a camera 201, a plurality of illumination light sources 202, a plurality of distance detection light sources 203 and so on. The plurality of illumination light sources 202 has a large irradiation angle and emit a light to a whole of a biometric body. The plurality of illumination light sources 202 are arranged around the camera 201.

FIG. 1B illustrates a side view of the distance detection light source 203. As illustrated in FIG. 1B, the distance detection light source 203 has a light-emitting element 204 and a condenser lens 205. The condenser lens 205 condenses a light emitted by the light-emitting element 204. Therefore, an irradiation angle of the distance detection light source 203 is small. Accordingly, a light irradiation range to a biometric body by each distance detection light source 203 is spaced from each other. That is, the distance detection light source 203 emits a spot light to the biometric body.

The illumination light source 202 and the distance detection light source 203 alternately emits a light. When the illumination light source 202 emits a light, the light is emitted to whole of the biometric body. Thus, the camera 201 captures an image of the whole of the biometric body. When the distance detection light source 203 emits a light, the spot light is emitted to a part of the biometric body.

FIG. 1C illustrates a positional relationship between the camera 201 and a biometric body 206. FIG. 1C illustrates a case where the biometric body 206 is near the camera 201 and a case where the biometric body 20 is far from the camera 201. FIG. 1D illustrates a biometric image captured by the camera 201 at an emission timing of the illumination light source 202 and a spot light image captured by the camera 201 at an emission timing of the distance detection light source 203, in a case where the biometric body 206 is far from the camera 201. FIG. 1E illustrates a biometric image captured by the camera 201 at an emission timing of the illumination light source 202 and a spot light image captured by the camera 201 at an emission timing attic distance detection light source 203, in a case where the biometric body 206 is near the camera 201.

As illustrated in FIG. 1D, when the biometric body 206 is far from the camera 201, the biometric body 206 is small in the biometric image, in this case, the spot light is small, and a distance between spot lights is small. As illustrated in FIG. 1E, when the biometric body 206 is near the camera 201, the biometric body 206 is large in the biometric image. In this case, the spot light is large, and the distance between spot lights is large, in this manner, there is a correlation between the distance between the camera 201 and the biometric body 206 and a size of the spot light or a distance between spot lights. FIG. 1F illustrates a relationship between the distance between spot lights and the distance between the camera 201 and the biometric body 206. As illustrated in FIG. 1F, when the distance between spot lights is acquired, distance information between the camera 201 and the biometric body 206 can be acquired. When the distance information is corrected and stored, it is possible to correct a size of the biometric body in the biometric image with use of the stored distance information.

When the illumination light source 202 and the distance detection light source 203 alternately emit a light, there is a timing gap of light emission between the illumination light source 202 and the distance detection light source 203. In this case, when the biometric body moves with respect to the camera 201, a correction accuracy of the biometric body size in the biometric image may be degraded. For example, a description will be given of a case where the biometric body gets closer to the camera 201. FIG. 2A illustrates a case where the biometric body 206 gradually gets closer to the camera 201 from a time t1 to a time t6. At a time t1, a time t3 and a time t5, the illumination light source 202 emits a light. At a time t2, a time t4 and a time t6, the distance detection light source 203 emits a light.

FIG. 2B illustrates an image captured in a case where a switching of light emission of the illumination light source 202 and the distance detection light source 203 is sufficiently faster than a movement of the biometric body 206. When the switching is sufficiently fast, the difference between the capture timing of the biometric body 206 and the capture timing of the spot light is small as illustrated in FIG. 2B, FIG. 2C illustrates an image capture in a case where the switching of light emission of the illumination light source 202 and the distance detection light source 203 is sufficiently slower than the movement of the biometric body 206. As illustrated in FIG. 2C, the difference between the capture timing of the biometric body 206 and the capture timing of the spot light is large. In this case, even if the biometric image is corrected in accordance with the distance between the spot lights, correction accuracy may be low.

And so, it is thought that a light of each optical device is received at the same timing. However, in this case, it is necessary to provide an optical device for detecting biometric information and an optical device for detecting a distance. In this case, component cost may be large. In the following embodiments, a description will be given of a biometric capture device, a biometric capture method and a biometric capture program that are capable of suppressing a component cost and achieving high correction accuracy.

First Embodiment

FIG. 3A illustrates a biometric authentication device 100 in accordance with a first embodiment. As illustrated in FIG. 3A, the biometric authentication device 100 has a capture device 10, a process unit 20, an authentication unit 30 and so on. The capture device 10 has a camera 11, a plurality of illumination light sources 12, a plurality of distance detection light sources 13 and so on. Each component of the capture device 10 is provided on a rectangular substrate.

For example, the camera 11 is provided on a center of the substrate. The plurality of illumination light sources 12 surrounds the camera 11 around the camera 11. In FIG. 3A, the number of the illumination light sources 12 is eight. The illumination light source 12 has a large irradiation angle and emits a light to the whole of the biometric body. The illumination light source 12 emits a light of a first wavelength or a predetermined wavelength range including the first wavelength. In the embodiment, the illumination light source 12 emits a near-infrared light. The first wavelength is 750 nm to 1400 nm.

FIG. 3B illustrates a side view of the distance detection tight source 13. As illustrated in FIG. 3B, the distance detection light source 13 has a light-emitting element 14 and a condenser lens 15. A light emitted by the light-emitting element 14 is condensed by the condenser lens 15. Therefore, an irradiation angle of the distance detection light source 13 toward the biometric body is small. Accordingly, each irradiation range of each distance detection light source 13 is spaced from each other. That is, the distance detection light source 13 emits a spot light to the biometric body. In an example of FIG. 3A, four distance detection light sources 13 are arranged on four corners of the substrate. The plurality of distance detection light sources 13 emit a light of a second wavelength different from the first wavelength or a predetermined wavelength range including the second wavelength. In the embodiment, the plurality of distance detection light sources 13 emit a blue light. And the second wavelength is 465 nm to 485 nm. When the wavelength range of the illumination light source 12 and the distance detection light source 13 has a range, the wavelength range of the illumination light source 12 does not include the second wavelength and the wavelength range of the distance detection light source 13 does not include the first wavelength.

FIG. 3C illustrates a relationship between a wavelength of an emitted light to the biometric body and a reflection position of the biometric body. As illustrated in FIG. 3C, the reflection position of the biometric body fluctuates according to the wavelength of the emitted light. In concrete, the reflection position gets deeper from a skin surface, as the wavelength gets longer. For example, the blue light is reflected by an epidermis. A near-infrared light is reflected by a hypodermis. Therefore, when emitted lights having a different wavelength are used, it is possible to acquire a plurality of different information from the biometric body. In the embodiment, when a near-infrared light is used, it is possible to acquire information of a hypodermis such as a vein pattern. When a blue light is used, it is possible to acquire information of an epidermis near the skin surface of the biometric body. The blue light is reflected at a skin surface or a position near the skin surface of the biometric body. Therefore, blurring and scattering are small, compared to a near-infrared light wavelength, and an outline of the spot light is sharp. Therefore, distance detection accuracy is improved.

The camera 11 is a capture device having a sensitivity with respect to at least on of the first wavelength and the second wavelength. In the embodiment, the camera 11 is a color image sensor. FIG. 3D illustrates an image of a B (blue) pixel captured by the camera 11, an image of a (green) pixel captured by the camera 11, and an R (red) pixel captured by the camera 11. The distance detection light source 13 emits a blue light. Therefore, a spot light appears in the image of the B pixel. The illumination light source 12 emits a near-infrared light. Therefore, a whole of the biometric body appears in the image of the R pixel.

FIG. 4A illustrates a block diagram of the process unit 20 and the authentication unit 30. As illustrated in FIG. 4A, the process unit 20 acts as a light source controller 21, an image acquirer 22, a distance information detector 23, a distance information storage 24, a biometric information detector 25, a corrector 26 and so on. The authentication unit 30 acts as a biometric information storage 31, a comparer 32, an output unit 33 and so on.

Figure 4B:
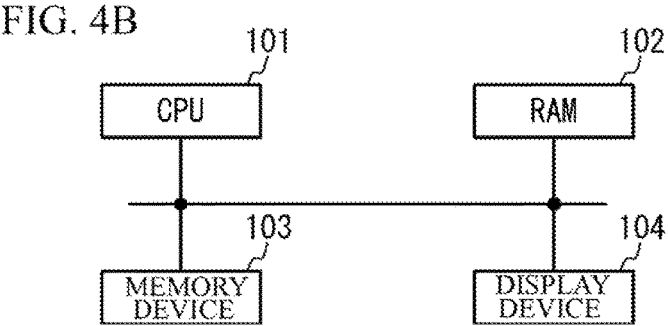
FIG. 4B illustrates a hardware structure of a process unit and a comparer.

FIG. 4B illustrates a hardware structure of the process unit 20 and the authentication unit 30. As illustrated in FIG. 4B, the process unit 20 and the authentication unit 30 have a CPU 101, a RAM (Random Access Memory) 102, a memory device 103, a display device 104 and so on. These components are coupled to each other with a bus or the like.

The CPU 101 is a central processing unit. The CPU 101 includes one or more core. The RAM 102 is a volatile memory temporally storing a program executed by the CPU 101, a data processed by the CPU 101, and so on.

The memory device 103 is a nonvolatile memory device. The memory device 103 may be a SSD (Solid State Drive) such as a ROM (Read Only Memory) or a flash memory, or a hard disk driven by a hard disk drive. The memory device 103 stores a biometric capture program and a biometric authentication program in accordance with the first embodiment. The display device 104 is such as a liquid crystal device.

The biometric capture program and the biometric authentication program stored in the memory device 103 are developed to the RAM 102. The CPU 101 executes the biometric capture program and the biometric authentication program developed to the RAM 102. When the biometric capture program is executed, each unit of the process unit 20 is achieved. When the biometric authentication program is executed, each unit of the authentication unit 30 is achieved.

(Enrollment Process) A description will be given of an enrollment process based on FIG. 5. FIG. 5 illustrates a flowchart of the enrollment process. In the enrollment process, biometric information of a user is stored in the biometric information storage 31 as a biometric template in advance, and distance information between a biometric body of the user and the camera 11 is stored in the distance information storage 24 in advance.

As illustrated in FIG. 5, the light source controller 21 makes the illumination light source 12 and the distance detection light source 13 emit a light simultaneously (Step S1). This means that a light emission period of the illumination light source 12 entirely or partially overlaps with a light emission period of the distance detection light source 13. Therefore, a start timing and an end timing of the light emission of the illumination light source 12 may be different from those of the distance detection light source 13.

Next, the image acquirer 22 acquires an image from the camera 11 at a timing when both of the light source 12 and the distance detection light source 13 emit a light (Step S2). Next, the distance information detector 23 detects distance information between the biometric body and the camera 11 with use of B pixel image of the image captured by the camera 11 (Step S3). The distance information has a correlation with a distance between the camera 11 and the biometric body. For example, the distance information is such as a size of a spot light, a shape of a spotlight, a distance between spot lights or the like. In the embodiment, the distance between spot lights is used as the distance information. Next, the distance information storage 24 stores the distance information detected by the distance information detector 23 (Step S4).

Next, the biometric information detector 25 detects biometric information with use of the R pixel image of the image captured by the camera 11 (Step S5). For example, the biometric information detector 25 detects a palm shape, a palm print, a vein pattern or the like as the biometric information. Next, the biometric information storage 31 stores the biometric information detected by the biometric information detector 25. With the processes, the enrollment process is terminated.

Figure 6:
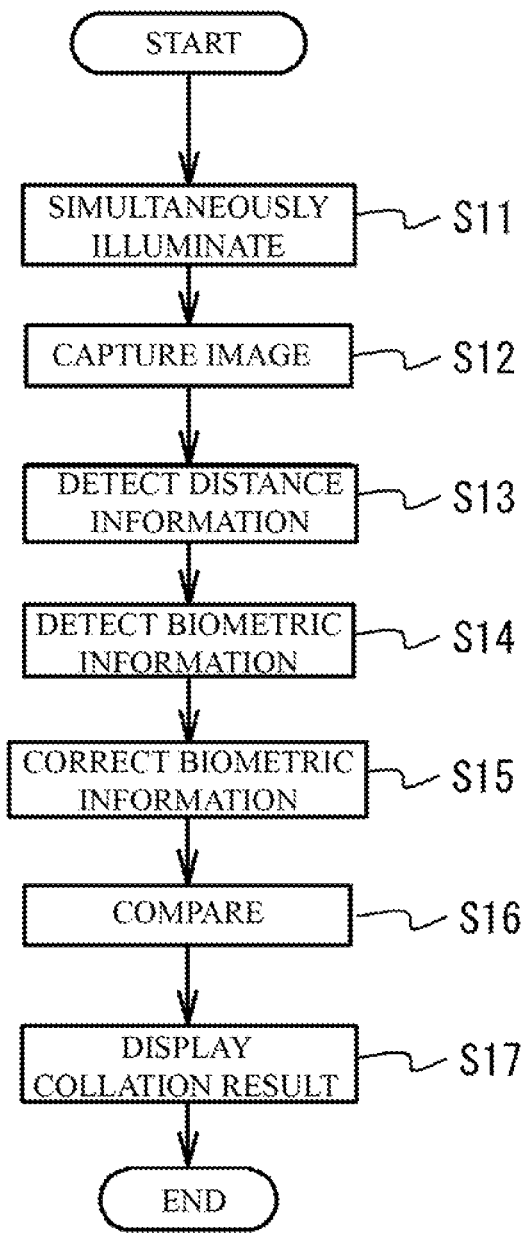
FIG. 6 illustrates a flowchart of an authentication process.

(Authentication process) A description will be given of an authentication process based on FIG. 6. FIG. 6 illustrates a flowchart of the authentication process. As illustrated in FIG. 6, the light source controller 21 makes the illumination light source 12 and the distance detection light source 13 emit a light simultaneously (Step S11). Next, the image acquirer 22 acquires an image from the camera 11 (Step S12). Next, the distance information detector 23 detects a distance between spot lights as the distance information with use of a B pixel image of the image captured by the camera 11 (Step S13).

Next, the biometric information detector 25 detects biometric information with use of an R pixel image of the image captured by the camera 11 (Step S14). Next, the corrector 26 corrects the biometric information detected in Step S14 so that the distance information detected in Step S13 gets closer to the distance information stored in the distance information storage 24 (Step S15).

For example, when a spot light size, a spot light shape, a distance between two spot lights or the like is used as the distance information, a distance between the camera 11 and the biometric body is acquired. Thus, it is possible to reduce a difference of a magnification ratio between the biometric information acquired in the authentication process and the biometric information acquired in the enrollment process. When three or more distances among spot lights is used as the distance information, it is possible to acquire an inclination angle of the biometric body in addition to the distance between the camera 11 and the biometric body. In this case, it is possible to reduce the difference of the magnification ratio between the biometric information acquired in the authentication process and the biometric information acquired in the enrollment process. Moreover, it is possible to reduce a difference of the inclination angle between the biometric body in the authentication process and the biometric body in the enrollment process. That is, it is possible to reduce a difference of a posture between the biometric body in the authentication process and the biometric body in the enrollment process.

Next, the comparer 32 compares the corrected biometric information with the biometric information stored in the biometric information storage 31 (Step S16). For example, the comparer 32 determines whether a similarity between the corrected biometric information and the biometric information stored in the biometric information storage 31 is equal to or more than a threshold. Next, the output unit 33 makes the display device 104 show the comparison result of the comparer 32 (Step S17). With the processes, the authentication process is terminated.

In the embodiment, a first wavelength light is emitted to a biometric body, and a second wavelength light is emitted to the biometric body. A biometric image is acquired based on the first wavelength component from an image captured by a camera. And, distance information between the camera and the biometric body is acquired based on the second wavelength component. In this manner, when wavelength components having a different wavelength are used, it is possible to acquire the biometric image and the distance information from the image captured by the camera without a plurality of image capture devices even if both of the first wavelength light and the second wavelength light are emitted. When the biometric image is corrected with use of the distance information, it is possible to improve authentication accuracy using a biometric image.

As illustrated in FIG. 3C, when the wavelength is shorter, the light is reflected at a position nearer the skin surface. When the light is reflected at a position near the skin surface, the blurring, the scattering and so on of the reflection light can be suppressed. It is therefore preferable that a wavelength shorter than the first wavelength is used as the second wavelength. For example, it is preferable that the second wavelength is a visible light range wavelength, and the first wavelength is a near-infrared range wavelength.

It is easier to detect a brightness value center of a spot light than to detect an outer edge of the spot light. Therefore, when a distance between a plurality of spot lights is detected with use of the plurality of spot lights, the accuracy of detecting the distance between the biometric body and the camera 11 is improved. When three or more spot lights are used, it is possible to acquire an inclination angle of the biometric body. In this case, it is possible to correct a posture of the biometric body, and the authentication accuracy is improved.

Although the biometric information detected in Step S14 is corrected in the embodiment, the structure is not limited. For example, the biometric image may be corrected, and biometric information may be detected from the corrected biometric image. In any cases, the biometric information acquired from the biometric image is corrected. The biometric information stored in the biometric information storage 31 may be corrected. For example, the biometric information stored in the biometric information storage 31 may be corrected so that the distance information acquired in the enrollment process gets closer to the distance information acquired in the authentication process.

Second Embodiment

Figure 7A:
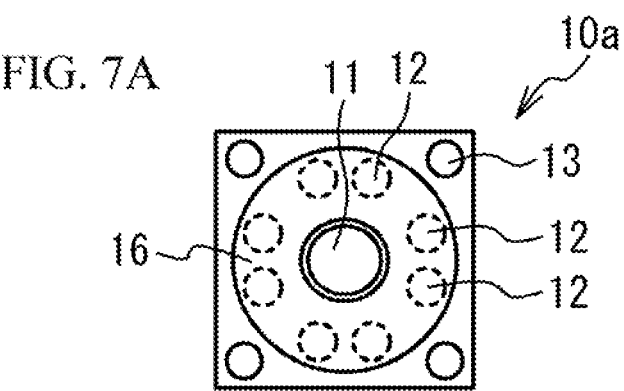
FIG. 7 illustrates a plan view of an image capture device in accordance with at second embodiment.
FIG. 7B illustrates a cross sectional view of FIG. 7A.
Figure 7B:
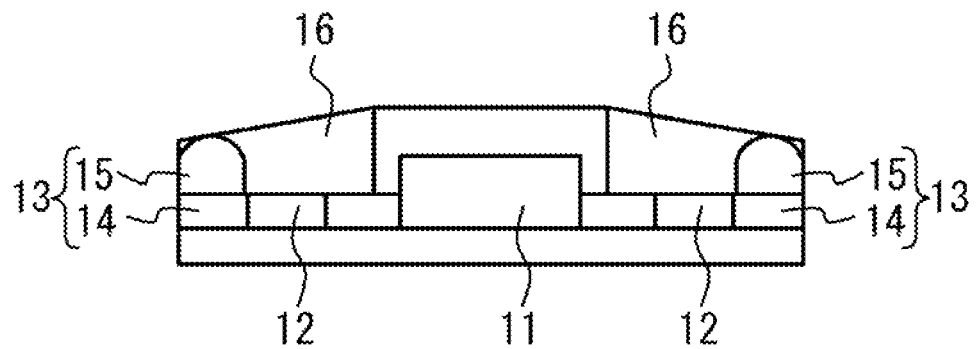

FIG. 7A illustrates a plan view of a capture device 10*a* in accordance with a second embodiment. FIG. 7B illustrates a cross sectional view of FIG. 7A. As illustrated in FIG. 7A and FIG. 7B, the capture device 10*a* has an optical conductor 16 for equalizing distribution of the emitted light of the illumination light source 12. The optical conductor 16 is arranged on the plurality of illumination light sources 12. The optical conductor 16 is arranged so that the emitted light of the distance detection light source 13 does not enter the optical conductor 16 and the emitted light of the illumination light source 12 enters the optical conductor 16.

As illustrated in FIG. 7B, the optical conductor 16 has a wedge-shaped cross section. As illustrated in FIG. 7A, the optical conductor 16 has a doughnut shape having a center through which an optical axis of the camera 11 passes. Moreover, the optical conductor 16 has an asperity for scattering a light toward an input side of the optical conductor 16 or an output side of the optical conductor 16. For example, the optical conductor 16 has a structure such as a surface textured shape, a sandblast, or a prism groove that are structured with an asperity on the input side or the output side of the optical conductor 16. With the asperity structure, it is possible to emit an illumination light of the illumination light source 12 to the biometric body evenly. It is therefore possible to improve the authentication accuracy. The optical conductor 16 may have a square shape or, a rectangular shape. Each of condenser lenses for generating a spot light may be simultaneously formed at four corners. An optical conductor for emitting a light to a biometric body and a condenser lens for a spot light may be structured with a single member. In this case, it is possible to reduce a cost. The optical conductor 16 may be made of a plastic such as acrylic or polycarbonate, or a glass. When plastic is used, the cost can be reduced more.

Third Embodiment

Figure 8A:
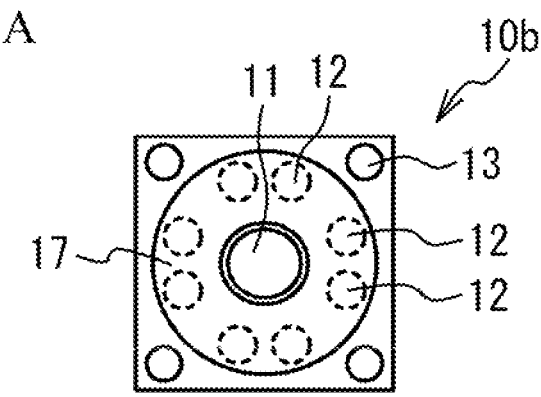
FIG. 8A illustrates a plan view of an image capture device in accordance with as thud embodiment.
Figure 8B:
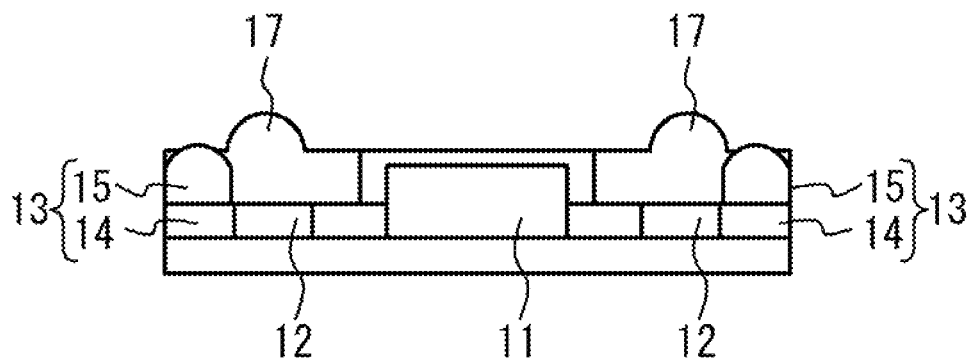
FIG. 8B illustrates a cross sectional view of FIG. 8A.

FIG. 8A illustrates a plan view of a capture device 10*b* in accordance with a third embodiment. FIG. 8B illustrates a cross sectional view of FIG. 8A. As illustrated in FIG. 8A and FIG. 8B, the capture device 10*b* has a lens array 17 instead of the optical conductor 16. The lens array 17 has a lens on the light emission side of each illumination light source 12. The lens array 17 is arranged so that the emitted light of the distance detection light source 13 does not enter the lens array 17 and the emitted light of the illumination light source 12 enters the lens array 17.

As illustrated in FIG. 8A, the lens array 17 has a doughnut shape having a center through which an optical axis of the camera 11 passes. Moreover, the lens array 17 has an asperity for scattering a light toward an input side of the lens array 17 or an output side of the lens array 17. For example, the lens array 17 has a structure such as a surface textured shape, a sandblast, or a prism groove that are structured with an asperity on the input side or the output side of the lens array 17. With the asperity structure, it is possible to emit an illumination light of the illumination light source 12 to the biometric body evenly. It is therefore possible to improve the authentication accuracy. The lens array 17 may have a square shape or a rectangular shape. Each of condenser lenses for generating a spot light may be simultaneously formed at four corners. A lens array for emitting a light to a biometric body and a condenser lens for a spot light may be structured with a single member. In this case, it is possible to reduce a cost. The lens array 17 may be made of a plastic such as acrylic or polycarbonate, or a glass. When plastic is used, the cost can be reduced more.

Fourth Embodiment

FIG. 9A illustrates a plan view of a capture device 10*c* in accordance with a fourth embodiment. FIG. 9B illustrates a cross sectional view of FIG. 9A. As illustrated in FIG. 9A and FIG. 9B, the capture device 10*c* has a diffraction optical element array 18 instead of the optical conductor 16. The diffraction optical element array 18 has a diffraction optical element on the light emission side of each illumination light source 12. The diffraction optical element array 18 is arranged so that the emitted light of the distance detection light source 13 does not enter the diffraction optical element array 18 and the emitted light of the illumination light source 12 enters the diffraction optical element array 18.

As illustrated in FIG. 9A, the diffraction optical element array 18 has a doughnut shape having a center through which an optical axis of the camera 11 passes. The illumination light source 12 can emit a light to a necessary region of a biometric body with distribution, because each diffraction optical element is arranged on the illumination light source 12. Thus, the authentication accuracy can be improved.

FIG. 9C illustrates details of the diffraction optical element. As illustrated in FIG. 9C, the diffraction optical element is an ensemble of diffractions, in the diffraction optical element, a desirable pixel number of micro diffractions of which pitch and rotation direction are different from each other are arrayed. As an example, the biometric size is 110 mm×110 mm. A size of a light-emitting portion of the illumination light source 12 is 3 mm×3 mm. An emitted wavelength is 545 nm. An interval between the illumination portion of the illumination light source 12 and the diffraction optical element is 5 mm. A substrate of the diffraction optical element array is synthetic silica and has a thickness of 2 mm. In this case, as illustrated in FIG. 9D, when the diffraction optical element array (size is 5 mm) is structured with 250 pixels×250 (total is 62,500) number of diffraction optical elements having a Cell size of 0.02 mm, an effective square even distribution can be achieved in the illumination to the biometric body. The number of the pitch and the rotation direction of each diffraction is enormous. Therefore, for simplicity, details are omitted. The diffraction optical element array 18 may be made of a plastic such as acrylic or polycarbonate, or a glass. When plastic is used, the cost can be reduced more.

Fifth Embodiment

FIG. 10A illustrates a plan view of a capture device 10d in accordance with a fifth embodiment FIG. 10B illustrates a cross sectional view of FIG. 10A. As illustrated in FIG. 10A and FIG. 10B, the capture device 10d has a diffraction optical element array 19 instead of the diffraction optical element array 18. The diffraction optical element array 19 has a diffraction optical element on the light emission side of each illumination light source 12 and each distance detection light source 13. The lens of the illumination light source 12 and the distance detection light source 13 can be structured by a single member. It is therefore possible to reduce the number of components.

FIG. 10C illustrates details of the diffraction optical element for the distance detection light source 13. As illustrated in FIG. 10C, the diffraction optical element is an ensemble of diffractions. In the diffraction optical element, a desirable pixel number of micro diffractions of which pitch and rotation direction are different from each other are arrayed. Outwardly, the diffraction optical element is similar to the diffraction optical element for the illumination source 12 illustrated in FIG. 9C. However, as described later, the Cell size, the pixel number (PIX), the pitch of each diffraction and a rotation direction of each diffraction are different from those of the diffraction optical element of FIG. 9C. As an example, the biometric size is 110 mm×110 mm. A size of a light-emitting portion of the distance detection light source 13 is 3 mm×3 mm. An emitted wavelength is 465 nm. An interval between the illumination portion of the distance detection light source 13 and the diffraction optical element is 5 mm. A substrate of the diffraction optical element is synthetic silica and has a thickness of 2 mm. In this case, as illustrated in FIG. 10D, when the diffraction optical element array (size is 3 mm) is structured with 120 pixels×120 (total is 14,400) number of diffraction optical elements having a Cell size of 0.025 mm, are effective square even distribution can be achieved in the illumination to the biometric body. The number of the pitch and the rotation direction of each diffraction is enormous. Therefore, for simplicity, details are omitted. The diffraction optical element array 19 may be made of an plastic such as acrylic or polycarbonate, or a glass. When plastic is used, the cost can be reduced more.

In the above-mentioned embodiments, the illumination light source 12 acts as an example of a first light source configured to emit a light of a first wavelength to a biometric body. The distance detection light source 13 acts as an example of a second light source configured to emit a light of a second wavelength different from the first wavelength to the biometric body. The camera 11 acts as an example of a camera configured to capture a reflected light from the biometric body. The biometric information detector 25 acts as an example of a biometric information acquirer configured to acquire a biometric image based on a component of the first wavelength from an image captured by the camera. The distance information detector 23 acts as an example of a distance information acquirer configured to acquire distance information between the biometric body and the camera based on a component of the second wavelength from the image captured by the camera. The corrector 26 acts as an example of a corrector configured to correct the biometric image based on the distance information. The capture device 10 and the process unit 20 act as an example of a biometric capture device.

All examples and conditional language recited herein are intended for pedagogical purposes to aid the reader m understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biometric capture device comprising:
    a first light source configured to emit a light of a first wavelength to a biometric body;
    a second light source configured to emit a light of a second wavelength different from the first wavelength to the biometric body, at least a part of a period of emitting by the second light source being overlapped with a period of emitting by the first light source;
    a camera configured to capture a reflected light from the biometric body during emitting by both the first light source and the second light source;
    a memory; and
    a processor coupled to the memory and the processor configured to execute a process, the process comprising:
    acquiring a biometric image based on a component of the first wavelength from an image captured by the camera;
    acquiring distance information between the biometric body and the camera based on a component of the second wavelength from the image captured by the camera; and
    correcting the biometric image based on the distance information.

2. The biometric capture device as claimed in claim 1, wherein the second wavelength is shorter than the first wavelength.

3. The biometric capture device as claimed in claim 1, wherein:
the second wavelength is a wavelength in a visible light range; and
the first wavelength is a wavelength in a near-infrared wavelength range.

4. The biometric capture device as claimed in claim 1, wherein:
in the acquiring of the distance information, an inclination angle of the biometric body is acquired based on the second wavelength component acquired from the three or more of the second light sources; and
in the correcting, the biometric image is corrected based on the inclination angle.

5. A biometric capture method comprising:
emitting a light of a first wavelength to a biometric body with a first light source;
emitting a light of a second wavelength different from the first wavelength to the biometric body with a second light source, at least a part of a period of emitting by the second light source being overlapped with a period of emitting by the first light source;
capturing a reflected light from the biometric body with a camera during emitting by both the first light source and the second light source;
acquiring a biometric image based on a component of the first wavelength from an image captured by the camera;
acquiring distance information between the biometric body and the camera based on a component of the second wavelength from the image captured by the camera; and
correcting the biometric image based on the distance information.

6. The biometric capture method as claimed in claim 5, wherein the second wavelength is shorter than the first wavelength.

7. The biometric capture method as claimed in claim 5, wherein:
the second wavelength is a wavelength in a visible light range; and
the first wavelength is a wavelength in a near-infrared wavelength range.

8. The biometric capture method as claimed in claim 5, wherein:
in the acquiring of the distance information, an inclination angle of the biometric body is acquired based on the second wavelength component acquired from the three or more of the second light sources; and
in the correcting, the biometric image is corrected based on the inclination angle.

9. A computer readable, non-transitory medium storing a program that causes a computer to execute a process, the process comprising:
emitting a light of a first wavelength to a biometric body with a first light source;
emitting a light of a second wavelength different from the first wavelength to the biometric body with a second light source, at least a part of a period of emitting by the second light source being overlapped with a period of emitting by the first light source;
capturing a reflected light from the biometric body with a camera during emitting by both the first light source and the second light source;
acquiring a biometric image based on a component of the first wavelength from an image captured by the camera;
acquiring distance information between the biometric body and the camera based on a component of the second wavelength from the image captured by the camera; and
correcting the biometric image based on the distance information.

10. The medium as claimed in claim 9, wherein the second wavelength is shorter than the first wavelength.

11. The medium as claimed in claim 9, wherein:
the second wavelength is a wavelength in a visible light range; and
the first wavelength is a wavelength in a near-infrared wavelength range.

12. The medium as claimed in claim 9, wherein:
in the acquiring of the distance information, an inclination angle of the biometric body is acquired based on the second wavelength component acquired from the three or more of the second light sources; and
in the correcting, the biometric image is corrected based on the inclination angle.

* * * * *